United States Patent [19]
Pfeifer

[11] Patent Number: 5,842,537
[45] Date of Patent: Dec. 1, 1998

[54] STEERING GEAR

[75] Inventor: Arnd Pfeifer, Hover-Kull, Germany

[73] Assignee: TRW Fahrwerksysteme GmbH & Co. KG, Dusseldorf, Germany

[21] Appl. No.: 716,385
[22] PCT Filed: Jan. 16, 1996
[86] PCT No.: PCT/EP96/00274
 § 371 Date: Nov. 15, 1996
 § 102(e) Date: Nov. 15, 1996
[87] PCT Pub. No.: WO96/22213
 PCT Pub. Date: Jul. 25, 1996

[30]  Foreign Application Priority Data

Jan. 20, 1995 [DE] Germany .................. 195 01 647.5

[51] Int. Cl.$^6$ ........................................ B62D 3/12
[52] U.S. Cl. ............................. 180/428; 180/439
[58] Field of Search .................... 180/417, 427, 180/428, 439

[56]  References Cited

U.S. PATENT DOCUMENTS

| 1,872,714 | 8/1932 | Farley | 180/428 |
| 4,599,911 | 7/1986 | Rosell | 180/428 |
| 4,608,876 | 9/1986 | Rosell | 180/428 |
| 4,629,026 | 12/1986 | Rosell | 180/428 |

FOREIGN PATENT DOCUMENTS

| 0144259 | 6/1985 | European Pat. Off. |
| 1933403 | 1/1970 | Germany. |

*Primary Examiner*—Kevin Hurley
*Attorney, Agent, or Firm*—Tarolli, Sundheim, Covell, Tummino & Szabo

[57]  ABSTRACT

A vehicle steering gear for transferring rotational movement of a pinion (6) associated with a vehicle steering mechanism into axial movement of a tie rod connected with steerable wheels in the vehicle. The steering gear comprises a piston (1), first and second piston rods (2), a cylinder (3) encircling the piston and partially defining first and second chambers which are separated by the piston. A piston ring (17) seals the piston (1) inside the cylinder (3). First and second bushings (4) seal the ends of the cylinder (3) around the piston rods (2). A rack member comprising an arcuate segment (5) is fixedly attached to the cylinder (3) and has a toothed surface portion and a threaded opening for receiving a tie rod fastener (16). A tubular housing (7) encircles the cylinder (3) and the arcuate segment (5). The pinion (6) is engageable with the toothed surface portion of the arcuate segment (5) within the housing (7). The housing (7) includes an oblong opening radially overlying the threaded opening in the arcuate segment (5) to permit axial movement of the tie rod fastener (16).

6 Claims, 1 Drawing Sheet

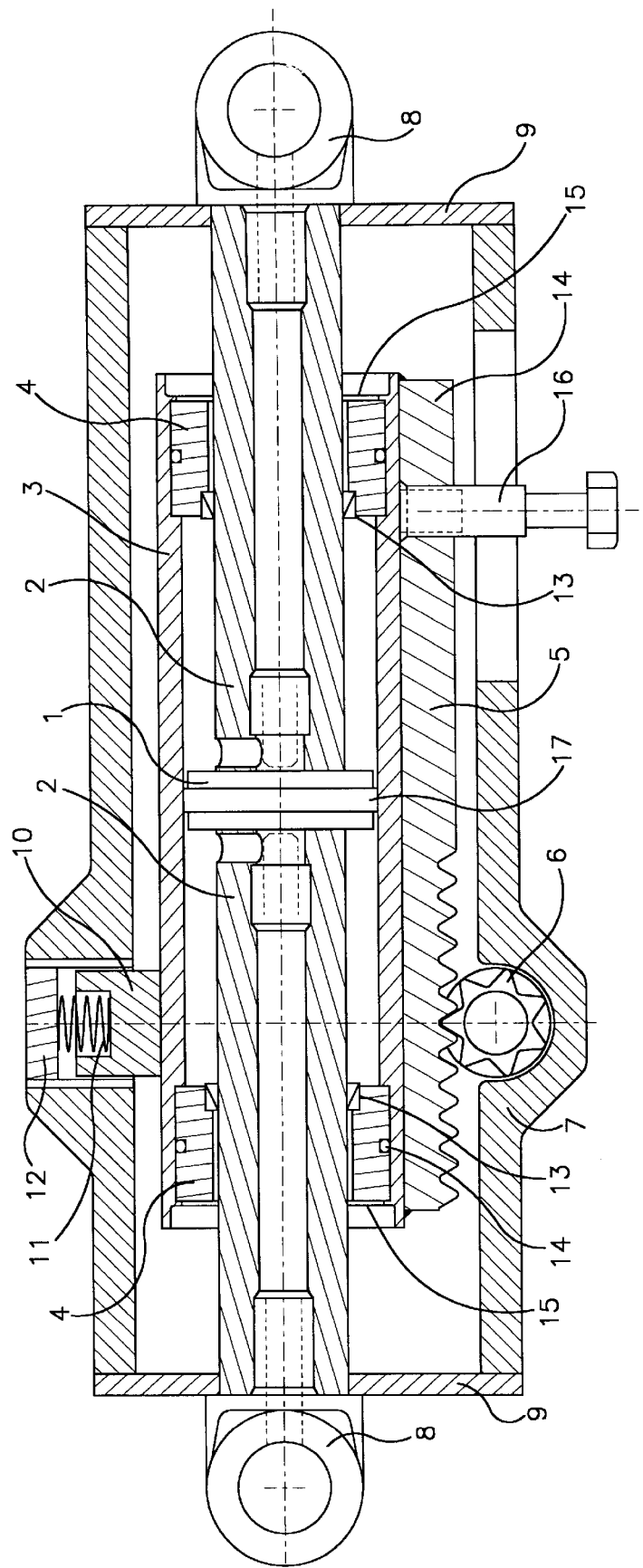

STEERING GEAR

FIELD OF THE INVENTION

The invention pertains to a steering gear having a cylinder/piston arrangement to which a hydraulic pressure can be applied, a toothed quadrant which can be brought into engagement with the pinion gear of a steering mechanism and a steering tie rod connection.

Steering gears of the same generic class are known in practical use from the state of the art and comprise a steering gear housing in which a cylinder is arranged in a rigidly connected manner, and a movable piston to which hydraulic pressure can be applied is arranged in said piston.

BACKGROUND OF THE INVENTION

On each side of the piston, a piston rod is arranged which projects laterally out from the cylinder and from the steering gear housing. A steering tie rod connection, e.g., in the form of a mounting flange is formed at the ends of the two piston rods. On one side, one of the piston rods is developed such that, when it projects out from the cylinder, it still moves across a certain length of the inside of the housing. This region of the piston rod features a toothing with which it is engaged with the pinion gear of a steering mechanism. The pinion gear is conventionally a component of a power-assisted steering unit, such that the steering gear transfers the rotary motion of a steering mechanism mechanically, by means of the pinion gear, and, at the same time, with hydraulic assistance by means of the cylinder/piston arrangement. The aforementioned arrangement can be executed in such a way that a piston is pressed onto an asymmetrically designed piston rod element. In order for a full steering swing toward both sides to be possible, conventional steering gears require a minimum overall length of six times the length of travel. It is practically impossible to reduce this overall length. A steering gear is conventionally mounted stationary in the vehicle with the housing. The two steering tie rod connections at the end of the two piston rods are connected to the steering tie rods and steering is brought about by means of the movement of the piston rods.

The development of a toothed quadrant on one of the piston rods necessitates the use of asymmetrical parts, i.e., different components are used on the two sides of the piston. The piston is fixed with respect to its construction, as is the production of the toothing on the piston rod. The piston and piston rod subassembly must be precisely coordinated with each other.

A construction as portrayed makes a hydraulic pressure connection costly. Conventionally, lines are led to the housing and connected through the same to the two cylinder chambers.

EP 0,144,259 B1 discloses a steering gear of this generic class. A cylinder, which moves with respect to a stationary piston on the basis of the application of hydraulic pressure, is arranged within a steering gear housing. A thrust transmitting piece holds this cylinder in the direction of a housing wall, on which a pinion gear housing is formed. A toothing is arranged within the housing to be in engagement with the pinion gear, which toothing is positioned in a resilient manner with respect to the cylinder. That is why a different location of the cylinder must feature a pedestal block for the steering tie rod connection.

A steering gear for a motor vehicles is known from DE-OS 1,933,403, with a steering rack connected directly to steerable wheels and connected to the pinion gear of a steering mechanism, such that, by means of an oblong member located parallel to the latter and connected to the steering rack, the oblong member moves together with the steering rack. DE-OS 1,933,403 discloses a scheme in which hydraulic assistance can also be carried out in a parallel housing segment in such a way that the housing element moves back and forth with respect to a piston that is held stationary by means of rods, and, as a consequence, moves the steering rack with the housing element.

SUMMARY OF THE INVENTION

The aforementioned steering gear, which belongs to the state of the art, is costly with respect to manufacture and assembly, necessitates a large minimum overall length, and is complex with respect to the adjustment and adaptation of the individual elements. The arrangement known from the generic EP 0,144,259 B1 is also complex, since the steering rack segment is supported in a resilient manner with respect to the cylinder. As a result, an additional steering tie rod connection and, consequently, a substantial manufacturing and assembly cost are required.

Starting from here, the underlying purpose of the present invention is to improve a steering gear of this generic class to the extent that its overall length is reduced and that it can be simplified with respect to the method of manufacture and assembly.

For a technical solution to this problem, it is proposed that the toothing be formed as a toothed quadrant in which a steering tie rod connection is integrated and fastened to the cylinder exterior.

A steering gear in accordance with the invention can be manufactured and assembled with extreme ease by means of the advantageous integral design of the toothed quadrant and steering tie rod connection.

For a steering gear in accordance with the invention, the toothing required for a mechanical connection of the steering wheel and wheels, and also the required steering tie rod connection, is located on the segment of the outside of the hydraulic cylinder at which the pressure required for power assistance is transferred to the piston rod. By means of a construction in accordance with the invention, it is possible to shorten the overall length by at least two times the length of travel, since the two overall lengths required for the steering racks originally arranged on the piston rods do not apply. It may be advantageous to have the toothing be in the form of a separate toothed quadrant and arranged on the cylinder exterior. The toothing can also be formed on the cylinder exterior during its manufacture. The toothed quadrant can be attached with screws, riveted, adhered or it can be formed. It is proposed, as an advantage, to manufacture the toothed quadrant by means of cold forming or sintering. In accordance with an advantageous configuration of the invention, the toothed quadrant can simultaneously feature a steering tie rod connection with an integral design, which advantageously is formed by means of a drill hole, pin or the like. It is advantageous for the cylinder to have a tubular cross section and to feature lateral seals which act on the piston rods.

A piston is arranged in the cylinder, can have an advantageous symmetrical form, and is advantageously manufactured by means of cold forming or sintering. At least one piston rod, which projects from the cylinder, is arranged on the piston, and the end of the piston rod, in accordance with one proposal of the invention, is fastened in a stationary manner in the vehicle. If piston rods are arranged on both sides of the piston, they can each advantageously feature a two-fold length of travel, resulting in an entire overall length of four lengths of travel. As is particularly advantageous the invention enables the use of symmetrical piston rod arrangements on both sides of the piston. The piston rods can have a tubular cross section; in particular, tubes can be used. The ends advantageously feature so-called fastening points, in so far as the piston rods are fastened outside of the cylinder. On the piston side, the tubular piston rods can be closed by means of the piston element. The connection between piston and piston rod can be carried out by means of screws, pressing, clamping, welding or the like. It is proposed, in a particularly advantageous manner, that the supply of pressure to the respective cylinder side be carried out by means of piston rods in the form of hollow profiles. It is particularly advantageous for the supply of pressure to be carried out by means of the fastening lug, through a hollow screw and into the piston rod interior. Alternatively, it is also possible to bring about a supply of oil to the cylinder by means of one or more radial grooves on the respective piston sides.

It is proposed that the cylinder be arranged in a housing which is at least wide enough to accommodate a pinion gear which combs the toothing. Because of this, the housing can be of a very narrow configuration and can advantageously feature a thrust transmitting piece which opposes the pinion gear, in order to press the pinion gear against the toothing on the cylinder side. Of course, the toothing can also be arranged in a lateral cylinder extension, such that the housing is reduced to a small clamped region, e.g., about a toothed rod.

With the configuration of a steering gear in accordance with the invention, the steering gear can be reduced substantially with respect to overall length, and manufactured and assembled with extreme ease. For example, sintered elements, as well as generally obtainable components, can be used. In this regard, only one piston rod is arranged on the piston and symmetrical elements having fastening arrangements located at the end and the like are used. The state of the art discloses one-piece piston rods only.

BRIEF DESCRIPTION OF THE DRAWINGS

Additional advantages and features of the invention ensue from the following description with the aid of the figure. Shown is:

FIG. 1: A schematic sectional representation of one embodiment of a steering gear.

DETAILED DESCRIPTION OF PREFERRED EMBODIMENTS

The steering gear shown in FIG. 1 comprises a piston (1), preferably manufactured in a sintering process, on both sides of which is arranged one piston rod (2) each, of a tubular configuration. In the embodiment shown, the piston rods are fastened with screws to the lateral piston elements. One radial drill hole is arranged in each region where the piston rods are connected to the piston and connects the piston rod interior to the respective chamber formed in the cylinder tube (3) on both sides of the piston. Retainers (8) are formed on the respective other ends of the two piston rods (2), and, in fact, in the form of a fastening lug for the embodiment shown. A hollow screw can be positioned in the fastening lug, such that hydraulic pressure can be guided through the hollow screw, through a drill hole which leads through the fastening lug (8) to the interior of the piston rod (2), through the piston rod (2), and through the radial drill hole into the respective cylinder chamber.

Both sides of the cylinder tube (3) feature sealing bushings (4), which hydraulically seal the cylinder from the piston rods; cylinder chambers ensue at both sides of the piston (1). The sealing bushings (4) feature a sealing ring (13), which faces inward, and are lodged in an end section of the cylinder tube (3) which has an enlarged diameter. In the embodiment shown, O-rings (14) are arranged against the tubular cylinder wall, along with so-called Seeger rings (15) in order to fix the bushings in a stationary manner.

A toothed quadrant (5), one side of which features a toothing and the other side of which features a threaded drill hole in which a screw (16) can be inserted as a steering tie rod connection, is arranged next to the cylinder tube (3) and extends over the longitudinal direction of the same.

The toothed quadrant (5) combs a pinion gear (6) of a steering mechanism, which is not represented further. For the embodiment shown, the overall system is inserted in a housing (7) that is rigidly connected to the piston rods (2) and features a thrust transmitting piece (10) opposite the space for accommodating the pinion gear, and by means of a thrust transmitting spring (11), the thrust transmitting piece is prestressed against a thrust transmitting cover (12) and consequently presses the cylinder (3), on which the toothed quadrant (5) is arranged, against the pinion gear (6). An oblong opening in the housing (7) makes the threaded drill hole for the steering tie rod connection in the form of screw (16) accessible and the screw (16) fully movable toward either side of travel.

A hydraulic seal is brought about by means of a piston ring (17) placed on the piston (1). The configuration described avoids the occurrence of a hydraulic drift by means of leakage, such that no arrangement must be put in place, as in the state of the art, in order to localize the steering rack.

The housing can also be in the form of a simple narrow housing in the region of the space for accommodating the pinion gear and, for its part, be arranged stationary in the functional region, e.g., of a passenger car.

The construction of the steering gear described is extremely simple and a limited number of like components can be used. The overall length is shortened by at least two lengths of travel and the supply of pressure is optimized. Manufacture and assembly are extremely simple and long-term trouble-free movement of the cylinder tube (3) is possible with respect to a piston (1) fixed by means of the fixing devices (8) and piston rods (2).

Having described the invention, I claim:

1. A vehicle steering gear for transferring rotational movement of a pinion associated with a vehicle steering mechanism into axial movement of a tie rod connected with steerable wheels in the vehicle, said steering gear comprising:

a piston having an outer surface;

first and second piston rods extending from opposite sides of said piston;

a cylinder encircling said piston and a portion of each of said piston rods, said cylinder including inner and outer surfaces and having oppositely disposed first and second ends, said cylinder partially defining first and second chambers which are separated by said piston;

means for sealing said outer surface of said piston to said inner surface of said cylinder;

means for sealing said first end of said cylinder around said first piston rod;

means for sealing said second end of said cylinder around said second piston rod;

a rack member fixedly attached to said outer surface of said cylinder, said rack member comprising an arcuate segment having a toothed surface portion and means for connecting to the tie rod, said means for connecting to the tie rod comprising a threaded opening for receiving a tie rod fastener, said threaded opening being axially spaced from said toothed surface portion of said arcuate segment; and a tubular housing encircling said cylinder and said arcuate segment attached to said cylinder, the pinion being engageable with said toothed surface portion of said arcuate segment within said housing, said housing including an oblong opening radially overlying said threaded opening in said arcuate segment, said oblong opening permitting axial movement of the tie rod fastener upon axial movement of said arcuate segment and said cylinder upon rotation of the pinion whereby such axial movement of the tie rod fastener results in the steerable wheels in the vehicle being steered.

2. The vehicle steering gear of claim 1 wherein said first and second piston rods are hollow and each has a radial opening adjacent said piston for directing hydraulic fluid into a respective one of said first and second chambers in said cylinder.

3. The vehicle steering gear of claim 1 wherein each said of said piston rods has an end portion which extends beyond said housing and which comprises a fastening lug.

4. The vehicle steering gear of claim 1 wherein said means for sealing said outer surface of said piston to inner surface of said cylinder comprises a piston ring.

5. The vehicle steering gear of claim 1 wherein said means for sealing said first end of said cylinder and said means for sealing said second end of said cylinder comprise first and second bushings, respectively, each of said bushings including a sealing ring and an O-ring.

6. The vehicle steering gear of claim 1 further comprising means for transmitting thrust loads to said rack member, said means for transmitting thrust loads being mounted in said housing at a location diametrically opposed to the pinion.

* * * * *